Nov. 5, 1963 N. A. BOLTON ETAL 3,110,009
ULTRASONIC VEHICLE DETECTOR SYSTEM
Filed Aug. 29, 1960 5 Sheets-Sheet 1

INVENTORS.
N. A. BOLTON AND
G. VANDE SANDE
BY
THEIR ATTORNEY

Nov. 5, 1963   N. A. BOLTON ETAL   3,110,009
ULTRASONIC VEHICLE DETECTOR SYSTEM
Filed Aug. 29, 1960   5 Sheets-Sheet 2

INVENTORS.
N. A. BOLTON AND
G. VANDE SANDE
BY
Forest B. Hitchcock
THEIR ATTORNEY

INVENTORS.
N. A. BOLTON AND
G. VANDE SANDE
BY
THEIR ATTORNEY

3,110,009
ULTRASONIC VEHICLE DETECTOR SYSTEM
Norman A. Bolton, Scottsville, N.Y., and George Vande Sande, Bethesda, Md., assignors to General Signal Corporation, a corporation of New York
Filed Aug. 29, 1960, Ser. No. 52,703
16 Claims. (Cl. 340—38)

This invention relates to the detection of objects and especially vehicles, and more particularly pertains to such a system wherein the objects or vehicles are detected as a result of the effects produced by their intersecting a beam of sound energy. This invention is analogous in subject matter to and is to be regarded in the nature of an improvement over what is disclosed and claimed in the prior applications of H. C. Kendall et al., Series No. 808,736, filed April 24, 1959, now United States Patent No. 3,042,303, issued July 3, 1962, and Serial No. 820,691, filed June 16, 1959, now United States Patent No. 3,042,899, issued July 3, 1962; and J. H. Auer, Jr., Serial No. 820,325, filed June 15, 1959, now United States Patent No. 3,045,909, issued July 24, 1962, all of which are assigned to the assignee of the present invention.

It is a common characteristic of the systems disclosed in these prior applications that a beam of repetitive sound pulses is transmitted by transmitting means including a sound transducer across the path of the objects or vehicles. A receiver is provided which includes a receiving transducer so positioned and directed that it receives and is responsive to the transmitted sound energy upon its reflection from sound reflecting surfaces on which the transmitted pulses impinge.

In each of the above-mentioned prior applications a free-running electronic oscillator establishes the repetition rate of pulse transmission by producing an output pulse for each sound pulse that is to be transmitted and applying such trigger pulse to a shock-excited oscillator which then generates a brief electrical pulse at the ultrasonic frequency. This latter pulse is then suitably amplified and applied to a transmitting transducer for transmission towards the passing vehicles.

As particularly disclosed in the above-mentioned prior Patent No. 3,042,303, the transmitted sound beam is preferably so directed and the receiving transducer so positioned that, in the absence of any vehicle, the transmitted sound energy is reflected from a fixed reflecting surface to the receiving transducer. However, when a vehicle is present, the sound beam is instead reflected from the surfaces of such vehicle back towards the receiving transducer. Such an arrangement may readily be provided for example, by positioning both transmitting and receiving transducers over a line of traffic and with both directed downwardly so that the transmitted sound beam is transmitted and reflected from the tops of passing vehicles back towards the receiving transducer. Thus, for each transmitted sound pulse, the receiving transducer receives a reflected pulse from the pavement when no vehicle is present but instead receives a reflected sound pulse from the top of each passing vehicle when a vehicle is present in the sound beam. The repetition rate of the transmitted sound pulse is made sufficiently slow to permit each sound pulse to be received by the receiving means following its reflection from the most distant reflecting surface (i.e. the pavement under these circumstances) prior to the transmission of the next sound pulse. This requirement eliminates ambiguity since it relates each reflection pulse definitely to the last transmitted pulse.

Because of the considerably longer propagation time that is involved when a reflection is received from the pavement as compared to a reflection received from the top of a passing vehicle, each pavement reflection pulse is received at a later time with respect to the transmitted sound pulse than is the vehicle reflection pulse. In the above-mentioned prior patents, electronic gating circuits are used which demarcate successive time intervals following the transmission of each sound pulse, and these gating circuits make it possible to distinguish a pavement reflection from a vehicle reflection. Patent No. 3,042,303 discloses the manner in which a plurality of individual timing circuits may be connected for successive operation so that each one demarcates a respective interval immediately upon the restoration of a preceding one to its normal condition. One of these gating circuits demarcates an interval encompassing the expected reception time of a vehicle reflection pulse and another timing circuit similarly demarcates a different later time interval encompassing the expected arrival time of a pavement reflection pulse.

A high degree of accuracy in vehicle detection is achieved in these prior systems by the ability to discriminate between the desired objects or vehicles to be counted and other extraneous objects, and this is brought about in part by so organizing the system that a single count can be registered only by going through a prescribed cycle of events. Such cycle comprises: firstly, as the vehicle enters the sound beam, the reception of reflections from the top of the passing vehicle concurrently with the interruption of sound reflections from the pavement; and, secondly, when the vehicle leaves the sound beam, the re-establishment of reflections from the pavement concurrently with the cessation of vehicle reflections. The requirement that there be a re-establishment of reflections from the pavement indicates positively the departure of the object or vehicle from the detection zone. Since it is necessary that all these conditions be met to register the presence of a vehicle, spurious interruption of reflections from the pavement resulting from the passage of people or animals through the detection zone cannot be improperly registered as vehicles. These conditions also provide that a vehicle having a plurality of sound reflecting surfaces spaced by non-reflecting surfaces, such as a convertible car, will be counted as single vehicle rather than as two separate vehicles corresponding to each of its sound reflecting surfaces. This comes about because the pavement reflections are still blocked at a time when the sound beam is impinging upon the sound-absorbing cloth top, with the result that the reflections from the rear deck as the vehicle moves in a forward direction through the sound beam cannot be improperly registered as a separate vehicle. These characteristics are explained in considerable detail in the previously-mentioned Kendall et al. Patent No. 3, 042,303.

It is desired to provide by this invention a vehicle detection system having the desirable characteristics mentioned above so that there will be the necessary high degree of discrimination between vehicles and extraneous objects which should not be registered and yet to provide a system such as this with a simplified organization which preferably does not require the complex electronic gating and timing and sound pulse generating circuits which are disclosed in the aforementioned applications. More specifically, it is contemplated to provide a rotating device which will on each revolution cause a sound pulse to be generated. Since the device will be rotated at a constant speed, the generated sound pulses will occur with a constant repetition rate which will, of course, be dependent upon the angular velocity of the rotating device. The rotating device is also adapted to demarcate successive intervals on each revolution. The first interval demarcated encompasses the expected reception time of vehicle reflection pulses, and a later time interval similarly encompasses the expected reception time of pavement reflection pulses. A plurality of embodiments are shown, illustrating various ways in which the rotating device can accomplish this gating function.

It is thus an object of this invention to provide an ultrasonic vehicle detection system wherein a rotating device on each revolution thereof causes a respective sound pulse to be transmitted and, furthermore, demarcates at least one preselected time interval during which reflections of said sound pulses will be received.

It is another object of this invention to provide a vehicle detection system wherein a circular device rotates at constant speed and on each revolution causes a respective sound pulse to be transmitted toward the vehicles to be detected and also is effective to demarcate at least one preselected time interval between successive transmitted sound pulses during which bona fide reflections of said sound pulses can be expected to thereby distinguish the bona fide reflection pulses from spurious reflection signals.

A further object of this invention is to provide a vehicle detection system wherein a constantly rotating means causes a sound pulse to be generated on each revolution thereof and also demarcates respective and separate time intervals between each successive pair of transmitted sound pulses to demarcate first the expected reception time of the vehicle reflection pulses and then the expected reception time of reflection pulses from a fixed reflecting surface more distant than said vehicles.

An additional object of this invention is to provide a sonic vehicle detection system wherein a rotating means, revolving with a constant angular velocity, generates repetitive sound pulses and also acts as a light shutter so as to demarcate respectively different time intervals in the interval between successive transmitted sound pulses and which time intervals correspond respectively to the expected reception times of reflections from the vehicles and alternatively from a fixed reflecting surface more distant than said vehicles.

A further object of this invention is to provide a sonic vehicle detection system wherein a rotating mirror causes an incident light beam to scan over spaced photocells and thereby both generate sound pulses to be transmitted toward the vehicles to be detected and to generate gating voltages demarcating respectively the expected reception times of sound pulses from each vehicle intercepting the sound pulse beam and from a fixed reflecting surface more distant than said vehicles.

Other objects, purposes and characteristic figures of this invention will in part be obvious from the accompanying drawings and in part pointed out as the description of the invention progresses.

To simplify the illustrations and facilitate in the explanation of the invention, various parts and circuits constituting the various embodiments thereof have been shown diagrammatically and certain conventional elements are disclosed in block form. The drawings have been made more with the purpose of making it easy to understand the principles and mode of operation than to illustrate the specific construction and arrangement of parts that might be used in practice. The symbol (B+) and the symbol for a ground indicate connections to the opposite terminals of a source of relatively high voltage suitable for the operation of various electron tubes and the like.

In describing this invention in detail, reference will be made to the accompanying drawings in which like reference characters designate corresponding parts throughout the several views and in which.

Figure 1A:
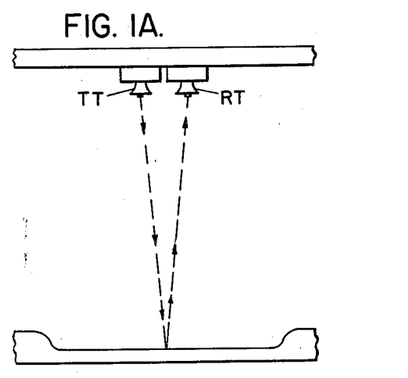
FIGS. 1A and 1B illustrate a possible arrangement of the transducers and demonstrate the variation in propagation times resulting when a vehicle is present as compared to when no vehicle is present.
Figure 1B:
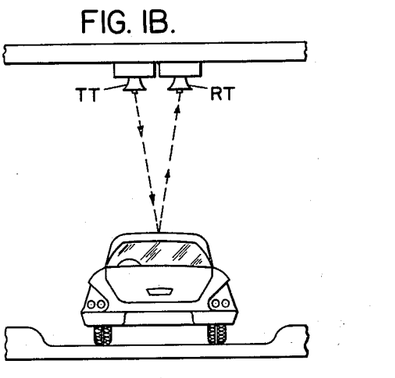

FIG. 1A illustrates the manner in which the receiving transducer RT and transmitting transducer TT may be mounted over the roadway. With no vehicle present within the sound beam, each transmitted sound pulse is reflected from the surface of the roadway back toward the receiving transducer. However, when a vehicle is present, each transmitted sound pulse is instead reflected from the upper sound reflecting surfaces of such vehicle. Obviously, in this latter case, the round-trip propagation time of each sound pulse is substantially shorter than when no vehicle is present as in FIG. 1A.

Figure 2:
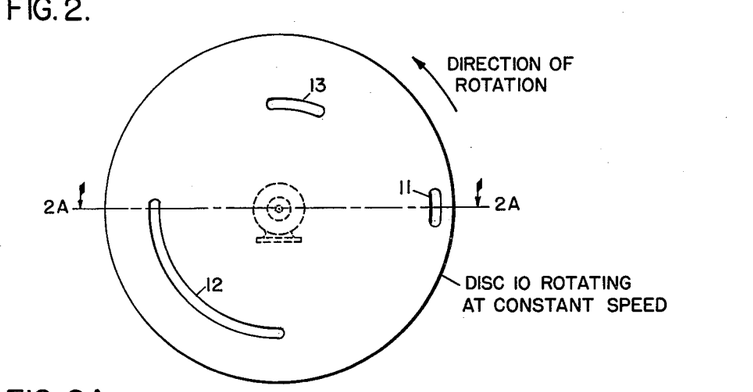
FIGS. 2 and 2A are diagrammatic illustrations of one embodiment of this invention employing a slotted disc which acts as a light shutter.

*Embodiment of FIG. 2*

Figure 2A:
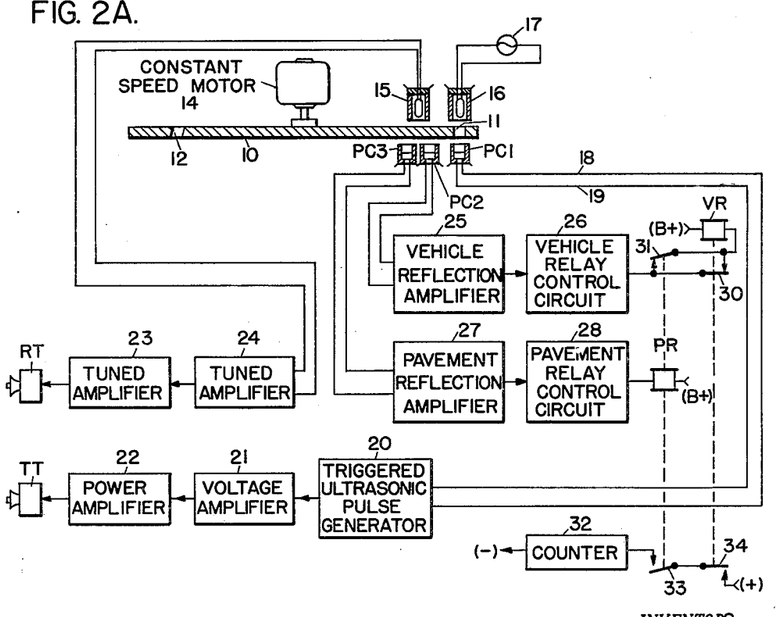

Referring now to the embodiment of the invention illustrated in FIG. 2, a circular disc 10 is illustrated having a plurality of arcuate slots therein as exemplified by the slots 11, 12, and 13 spaced at different radial distances from the center of the disc 10. The cross-sectional view of FIG. 2A diagrammatically illustrates a constant speed motor 14 which causes the disc 10 to be rotated at constant speed. It may be preferable to have the motor 14 be a synchronous motor so that its speed of rotation will be precisely constant and always at the same value which is, of course, dependent upon the line frequency. However, a non-synchronous motor may also be used if there are no substantial fluctuations in the line voltage since the constant load imposed on it will ordinarily produce only minor variations in its speed.

FIG. 2A also illustrates how the disc 10 with its arcuate slots acts as a light shutter. On one side of the disc are illustrated two light sources 15 and 16 which may comprise small neon lamps, for example, mounted in reflectors so as to direct a relatively narrow beam toward the face of the disc. Referring first to the light source 16, this is continually energized by a source of alternating current energy 17. Immediately opposite this light source, on the other side of disc 10, is a photocell PC1 which is positioned to receive light from the light source 16 but can only do so when disc 10 is in such a position that the slot 11 is interposed between the light source 16 and photocell PC1. The arcuate slot 11 is of relatively short length so that the light from light source 16 can impinge upon photocell PC1 for only a very brief interval upon each revolution of disc 10. When the light is thus permitted to impinge upon photocell PC1, an electrical voltage is generated therein which is applied over wires 18 and 19 to the triggered ultrasonic pulse generator 20. This pulse generator 20 comprises an oscillator which is normally maintained in an inoperative state but becomes operative to oscillate at a preselected ultrasonic frequency whenever it receives a gating input voltage over wires 18 and 19. Gated oscillators of this sort are well-known in the art so that a detailed description thereof need not be given. The output of this oscillator is applied to a voltage amplifier 21 and the output of this voltage amplifier is then applied to a power amplifier 22 which then feeds the transmitting transducer TT. The result is that, for each revolution of disc 10, a sound pulse having a frequency determined by the preselected frequency of operation of pulse generator 20 is transmitted toward the highway surface. Obviously, the pulse length is dependent upon the length of the arcuate slot 11 in disc 10 and upon the speed of rotation of this disc. The duration of each sound pulse may, of course, be selected as desired, but in one specific embodiment of this invention it was found desirable to cause each sound pulse to have a duration of approximately one millisecond.

The reflected sound pulses which are directed toward the receiving transducer RT cause this transducer to apply a corresponding electrical signal to the first of two tuned amplifiers 23 and 24. These amplifiers are both tuned to the frequency of the transmitted sound pulses so that they readily amplify reflection signals at that frequency but tend to reject extraneous signals at other frequencies which might be picked up by transducer RT. The output of the second tuned amplifier stage 24 thus comprises an alternating current signal of relatively short duration which is applied directly to the terminals of the lamp included in the light source 15. When the transmitted sound pulse is of very short duration, such as one millisecond, the reflection pulse from either the pavement or vehicle will similarly be of short duration and may thus be so short that it will not effectively illuminate the lamp in the light source 15. When this condition is encountered, it is desirable to modify the tuned amplifier 24 so that its output signal will be of greater duration than the input signal. Various expedients to accomplish this are well-known in the art, among them being various forms of "ringing" circuits. The result then is that the light source 15 emits a beam of light for each sound pulse reflection picked up by the receiving transducer RT.

On the opposite side of disc 10 are two additional photocells PC2 and PC3. These are positioned quite close together and so disposed relative to light source 15 that were it not for the presence of disc 10, the light emanating from light source 15 would impinge upon both of them and cause corresponding electrical signals to be generated in both of these photocells. However, the disc 10 provides a shutter effect so that photocell PC2 can be energized by light from light source 15 only when disc 10 is in such a position that arcuate slot 12 lies between them. Similarly, it is only when the arcuate slot 13 is directly opposite light source 15 that light can pass through this slot onto photocell PC3.

Slot 13 has a shorter radius than slot 12 so that it will lie opposite photocell PC3 on a portion of each revolution of disc 10; whereas, slot 12 will lie opposite photocell PC2 on a different portion of each revolution of disc 10. The edges of both slots are preferably beveled in opposite directions respectively so that light may readily travel from the light source 15 through slot 13 and impinge upon either photocell PC2 or PC3. Only the beveled edge of slot 12 is shown in FIG. 2A.

The speed of rotation of disc 10, the positioning of slot 12 with respect to the previously mentioned slot 11, and the length of this slot 12 together determine the time interval throughout which slot 12 lies in front of photocell PC2 and thus the interval throughout which a reflection pulse which illuminates light source 15 can produce an output signal from this photocell PC2. The combination of these various factors is selected so that this particular interval will encompass that period of time following the transmission of each sound pulse when a reflection of such pulse can be expected from a vehicle passing through the sound beam. The corresponding factors relative to the arcuate slot 13 are so selected that arcuate slot 13 will be opposite photocell PC3 throughout an interval of time which will be coextensive with that throughout which a reflection of the last transmitted sound pulse can be expected from the pavement. In other words, if the light source 15 is illuminated by a reflection pulse at a time when slot 12 lies between it and the photocell PC2, then an output signal of this photocell represents the reception of a reflection from a vehicle and not from the pavement. The resulting output signal of photocell PC2 is then applied as an input signal to the vehicle reflection amplifier 25 wherein it is amplified and then applied as a corresponding input signal to the vehicle relay control circuit 26. When on successive rotations of disc 10 respective input signals are applied for each such rotation to the input of amplifier 25, the normally picked up vehicle relay VR will eventually be dropped away and will remain in that state until the vehicle has left the detection zone so that amplifier 25 receives no more input signals.

When no vehicle is present so that reflection pulses are instead received from the pavement, then each such reflection signal will illuminate light source 15 at a later time in each cycle and at such time the arcuate slot 13 will lie between light source 15 and photocell PC3. For each revolution of the disc and for each sound pulse transmitted, the pavement reflection amplifier 27 receives an electrical input signal from photocell PC3. These signals are amplified by this amplifier and applied to the pavement relay control circuit 28 which is similar to the vehicle relay control circuit 26. When this control circuit 28 receives a plurality of successive inputs from amplifier 27, the normally picked up relay PR is dropped away. The normal conditions of relays PR and VR are assumed to be those existing when no vehicle is present so that pavement reflections are steadily being received but not vehicle reflections, and therefore relay PR is shown in a dropped away condition and relay VR is shown in a picked up condition.

Figure 8:
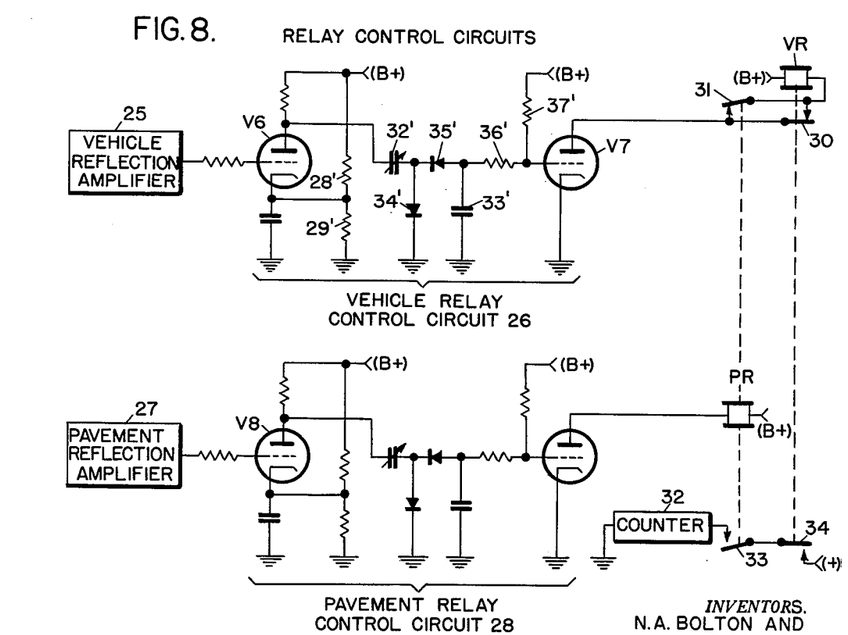
FIG. 8 is a circuit diagram of the relay control circuits which might be employed in any of the various embodiments.

Various types of control circuits might be employed for the control of relays VR and PR, a typical one of these circuits being illustrated in FIG. 8. The relay control circuits shown there comprise a triode amplifier tube V6 which has the output signals of the vehicle reflection amplifier 25 applied to its control grid. The output plate voltage of this tube is applied to the control grid of triode amplifier tube V7 and the plate current of this latter tube then energizes the winding of relay VR. The pavement relay control circuit 28 operates in a similar manner.

Considering the vehicle relay control circuit 26 somewhat more specifically, the output pulses of the vehicle reflection amplifier 25 are assumed to be unidirectional, positive-going voltage pulses. Where necessary, the output of amplifier 25 may include rectifying and filtering elements to provide this type of signal. Each such positive pulse is applied to the control grid of tube V6 and overcomes the normal cutoff bias effective on this tube by reason of the connection of its cathode to a positive source of voltage, namely, the junction of voltage dividing resistors 28' and 29' connected in series between (B+) and ground. Each pulse, therefore, produces a negative-going voltage pulse at the plate of tube V6. The sudden drop in plate voltage results in a negative charging of the series-connected capacitors 32' and 33' through the low forward resistance of diode 35'. The magnitude of the negative-going pulse at the plate of tube V6 is fairly constant, but the relative proportion of negative voltage acquired by capacitors 32' and 33' is dependent upon their relative size. If the variable capacitor 32' is made smaller in capacitance value as compared to capacitor 33', a larger proportion of the over-all voltage pulse appears across capacitor 32' and a smaller portion across capacitor 33'. At the conclusion of each negative pulse at the plate of tube V6, the plate voltage rises towards its normal high value. Diode 35' becomes immediately non-conductive but diode 34' now readily conducts, thereby maintaining the righthand terminal of capacitor 32' at substantially ground potential. At this time, the negative charge on capacitor 33' begins to discharge through resistors 36' and 37' but the discharge time constant for this circuit is a substantial multiple of the pulse repetition rate so that the amount of charge lost by capacitor 33' between successive pulses is only a small portion of the added charge that capacitor 33' receives in response to each negative-going voltage variation at the plate of tube V6.

The relative sizes of capacitors 32' and 33' and the discharge time constant for capacitor 33' were chosen in one specific embodiment of this invention to require that there be approximately 3 successive negative-going pulses at the plate of tube V6 before the voltage at the upper terminal of capacitor 33' had become sufficiently negative to drive the control grid of tube V7 so far negative with respect to the grounded cathode of this tube that relay VR in its plate circuit would drop away. The pavement relay control circuit 28 operates in the same manner. Since pavement reflections are being ordinarily received when no vehicle is present, tube V8 is normally cut off so that relay PR is normally dropped away.

The circuits for relays VR and PR are interlocked in such a manner that when a vehicle leaves the detection zone, relay VR can be rstored to its normal picked-up condition only if the pavement reflection relay PR has previously been restored to its normal dropped-away condition by the reception of pavement reflections. Normally, the energizing current for relay VR passes through the front stick contact 30 of this relay and through the parallel back contact 31 of relay PR. When relay VR drops away upon the entrance of a vehicle into the detection zone, it can then be subsequently picked up again only through back contact 31 of relay PR and this requires that relay PR first be dropped away. In other words, the relays can both be restored to their normal condition so that a subsequent normal cycle of operation can occur only if vehicle reflections cease so that there will be output energy of the control circuit 26 for energizing relay VR and also pavement reflections again occur so that relay PR will be dropped away and thereby close its back contact 31.

Contacts of relays VR and PR together control the energization of a vehicle counter 32. The picking up of relay PR and release of relay VR that occurs when a vehicle passes through the detection zone closes a circuit through front contact 33 of relay PR and back contact 34 of relay VR to energize the counter.

Figure 3:
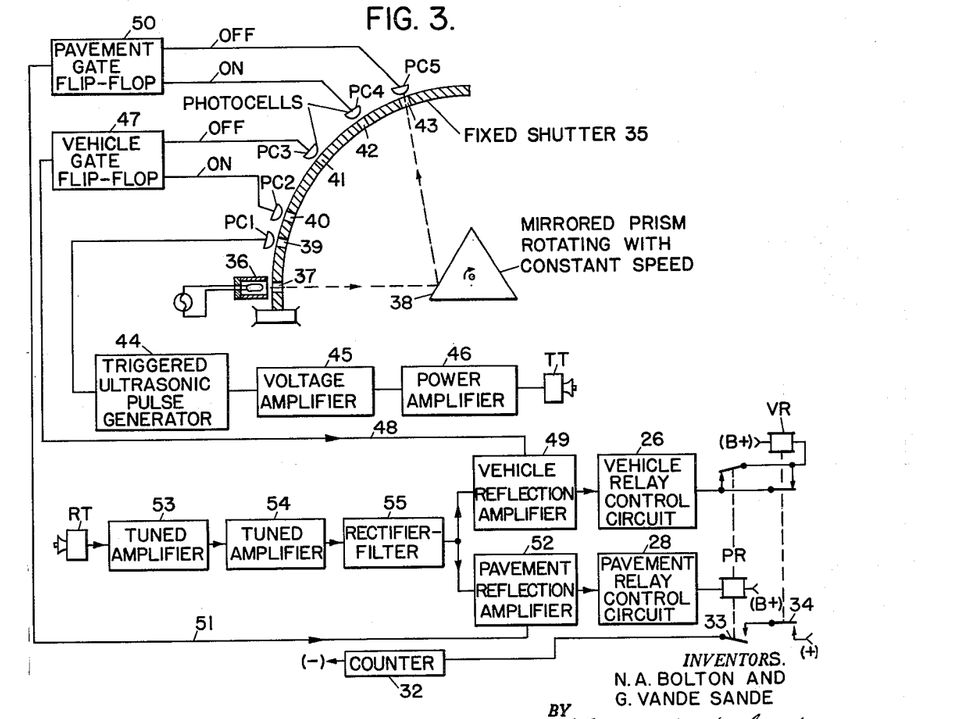
FIG. 3 diagrammatically illustrates another embodiment of this invention employing a mirrored prism which causes an incident light beam to scan a plurality of photocells as the prism rotates.

*Embodiment of FIG. 3*

Considering now the embodiment of FIG. 3, a light source 36 is shown and a plurality of spaced photocells PC1–PC5 which are scanned in succession. In this embodiment however, the shutter 35 which controls the emission of light onto the photocells is fixed in position and instead the light beam is swept through an angle by being reflected from a rotating mirrored surface.

The shutter 35 is shown in FIG. 3 as being of arcuate shape, but it will be appreciated that this is by no means essential and that the shutter could assume various shapes, although the curved surface shown in FIG. 3 is deemed preferable. A steadily energized light source 36 is illustrated which admits a beam of light through an opening 37 in shutter 35 to a surface of the mirrored prism 38 which rotates at constant speed in the direction shown. As each plane surface of the rotating prism is brought into position where the light beam impinges upon it, a reflection of such light beam is directed back toward the inner surface of the shutter 35 and as the prism continues its rotation the reflected beam passes in succession through the apertures 39, 40, 41, 42 and 43. When the reflected beam first impinges upon photocell PC1 as it passes through aperture 39, an electrical signal is momentarily generated in this photocell PC1 and this is applied as a triggering input signal to the triggered ultrasonic pulse generator 44, causing it to generate a short, electrical pulse at a predetermined ultrasonic frequency which may be in the order of 20 kc. The output signal of this pulse generator is amplified by voltage amplifier 45 and power amplifier 46 with the output of this latter amplifier being applied directly to the transmitting transducer TT so that a sound pulse is transmitted.

As the prism 38 rotates still further, the reflected light beam passes in succession through apertures 40 and 41 so that first photocell PC2 and then photocell PC3 are energized and provide electrical pulses to the vehicle gate flip-flop 47. Such flip-flops are well-known in the art so that no detailed description need be given here. Normally, the flip-flop 47 is in a condition wherein it cannot supply a gating voltage on wire 48. However, the output signal of photocell PC2 operates the flip-flop to an "on" condition as diagrammatically illustrated and the flip-flop will remain in that stable state until restored to the normal "off" condition by the pulse it later receives from photocell PC3. Throughout this interval that flip-flop 47 is in its "on" condition, it provides a gating voltage over wire 48 to the vehicle reflection amplifier 49 permitting this amplifier to respond to any signal it might receive from rectifier-filter 55. The pavement gate flip-flop 50 operates in a similar manner, being operated to the "on" state when the reflected light beam impinges upon photocell PC4 after passing through aperture 42 and being restored to its normal state when the light beam passes through aperture 43 and energizes photocell PC5. This flip-flop 50 while in its "on" state supplies a gating voltage over wire 51 to the pavement reflection amplifier 52.

Reflected sound pulses which are picked up by the receiving transducer RT are applied through a plurality of tuned amplifier stages 53 and 54 to a rectifier-filter 55 whose function is to rectify the alternating current output signal of amplifier 54 and to filter out the alternating current components leaving a negative-going voltage pulse for each reflection signal which is then applied to the inputs of both amplifiers 49 and 52. Each such input signal applied to amplifier 49 at a time when it receives the gating voltage over wire 48 from flip-flop 47 causes a positive-going voltage pulse to be applied to the vehicle relay control circuit 26. In a similar manner, each output pulse of rectifier-filter 55 applied to amplifier 52 when it receives a gating voltage over wire 51 from flip-flop 50, results in the application of a positive-going voltage pulse to the pavement relay control circuit 28. The two relay control circuits 26 and 28 may be organized according to the manner shown in FIG. 8 so that the relays VR and PR may be selectively operated in the manner previously described.

The spacing of the apertures and photocells is so selected in connection with the speed of rotation of prism 38 that flip-flop 47 will only be in the "on" condition during the expected reception time of vehicle reflection pulses, taking into account the variable propagation time of such reflection pulses which varies with different vehicle heights, and so that flip-flop 50 will only be in its "on" state during the expected reception time of pavement reflection pulses. Thus, no time circuits are required in this embodiment of the invention to demarcate the various gating voltages to permit differentiation between vehicle and pavement reflection pulses. Ordinarily, it is expected that each of the several surfaces of the prism would be mirrored so that each would be effective to produce the above-described cycle of events. Obviously, therefore, the prism 38 may rotate at a considerably slower speed than is required for the rotating disc of FIG. 2. The reason for this is that each revolution of the prism of FIG. 3 will produce a complete cycle of operation for each of its several plane surfaces, with the result that the three-sided prism 38 of FIG. 3 provides three complete cycles for each complete revolution.

Figure 4:
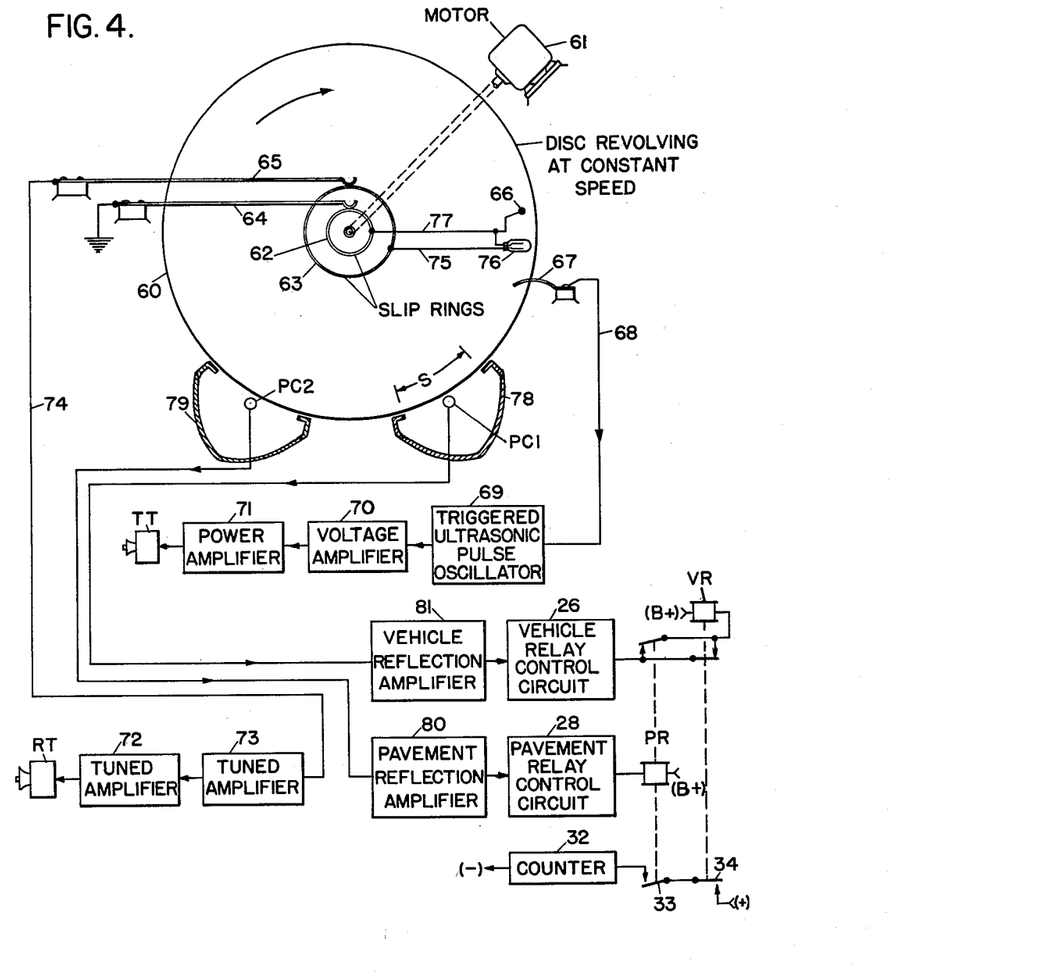
FIG. 4 illustrates another embodiment of this invention wherein a rotating disc has mounted thereon a light source which is illuminated by the received reflection signal and which scans parabolic mirrors disposed about the periphery of the disc.

*Embodiment of FIG. 4*

In the embodiment of the invention illustrated in FIG. 4, a disc 60 is rotated at constant speed by motor 61.

Concentric with the disc 60 and rotating therewith are two slip rings 62 and 63 which respectively are in contact with the two sliding contacts 64 and 65. For convenience in illustration, the two slip rings have been diagrammatically shown as having different diameters, but they could as well be of the same diameter but be axially spaced to provide the required electrical insulation between them.

The sliding contact 64 is connected permanently to ground with the result that slip ring 62 is then always at ground potential as well. Affixed to the rotating disc 60 and near its periphery is a projecting pin 66 which is electrically connected to slip ring 62 and is thus also always at ground potential. This pin 66 is positioned so that on each revolution of the disc 60 it will come into contact with a fixed contact 67 and thereby momentarily ground the wire 68 which is connected to this fixed contact 67. The momentary grounding of wire 68 has the effect of triggering the triggered ultrasonic pulse oscillator 69, thereby causing it to generate a short electrical pulse at the predetermined ultrasonic frequency. This pulse is then applied in succession to the voltage amplifier 70 and then the power amplifier 71 before being applied to the transmitting transducer TT. In this manner, for each revolution of disc 60, a sound pulse is transmitted by the transmitting transducer. Detailed circuits for the pulse oscillator 69 have not been shown as it will be entirely clear to one familiar with the art that various types of oscillators may be provided which will oscillate upon the grounding of one input terminal thereof.

Sound pulse reflections picked up by the receiving transducer are amplified by the successive tuned amplifier stages 72 and 73. The output of this latter amplifier 73 comprises an alternating current signal which is then applied over wire 74 and through sliding contact 65 to slip ring 63. This slip ring is electrically connected over wire 75 to one terminal of a neon lamp 76 which is affixed to disc 60 near its periphery and constantly rotates with the disc. The other terminal of neon lamp 76 is connected to wire 77 which is always at ground potential as previously described. The result then is that lamp 76 is illuminated in response to each reflection signal. The output signal of the tuned amplifier may be of quite short duration, particularly when the transmitted sound pulse is of short duration. If so, it may be desirable to provide any one of several well-known expedients associated with the output of amplifier 73 to lengthen the output signal of this amplifier as compared to its input signal. Also, of course, fixed contact 67 is not in the same plane as lamp 76 so that they cannot become in contact with each other; contact 67 only makes contact with the pin 66.

Disposed at preselected fixed locations about the periphery of the disc are two photocells PC1 and PC2. Associated with each is a parabolic reflecting surface so constructed that light impinging upon any portion of its inner reflecting surface will be reflected toward the associated photocell and cause it to generate an electrical output signal. The reflecting surface 78 is so constructed and positioned that the interval of time throughout which lamp 76 is opposite its inner reflecting surface corresponds to that time interval following the transmission of each sound pulse (occasioned by pin 66 coming in contact with fixed contact 67) throughout which a vehicle reflection pulse can be expected. Obviously, the length of this time interval depends upon the distance "S" and speed of rotation of disc 60 whereas the time of its delay with respect to the immediately preceding transmitted sound pulse is dependent upon the amount of time it takes for lamp 76 to reach a position opposite the surface 78 after pin 66 has come in contact with contact 67 and thereby caused the sound pulse to be transmitted. A similar reflecting surface 79 is positioned so that lamp 76 will be opposite it at a time when pavement reflection pulses can be expected.

As a result of this organization, a vehicle reflection pulse will illuminate lamp 76 at a time when it is in a position so that its light will be reflected toward photocell PC1. Similarly, a pavement reflection pulse will illuminate lamp 76 when it is in a position opposite reflecting surface 79 so that light emanating therefrom will energize photocell PC2. Consequently, if no vehicle is present within the detection zone so that only pavement reflections are received, photocell PC2 will be energized for each revolution of disc 60 and for each such energization an electrical pulse will be applied to pavement reflection amplifier 80. Of course, when a vehicle is present, these pavement reflection pulses will be cut off so that amplifier 80 will not receive input pulses; instead, the shorter propagation time of the vehicle reflection pulses that are then received will cause them to produce output signals from photocell PC1 so that vehicle reflection amplifier 81 will then receive an electrical input pulse for each rotation of disc 60.

The vehicle relay control circuit 26 and pavement relay control circuit 28 are similar to those previously described so that relay VR is normally picked up and relay PR normally dropped away. The conditions of both these relays are reversed when a vehicle is present, so that energy can be applied momentarily to counter 32 to register the passage of a vehicle.

Figure 5:
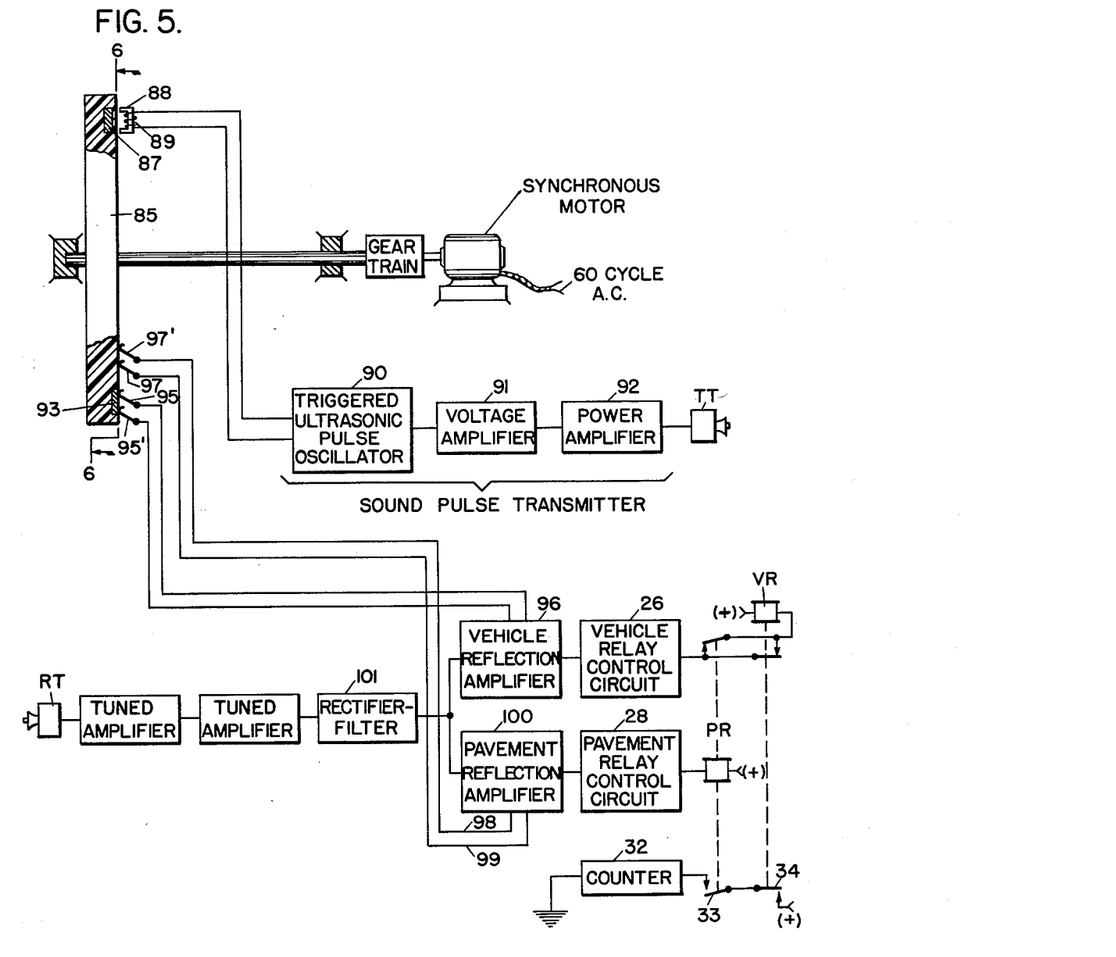
FIGS. 5 and 6 illustrate still another embodiment of this invention wherein a rotating disc has commutator like conductive segments which selectively contact various stationary contact members to demarcate the respective time intervals.
Figures 6, 7:
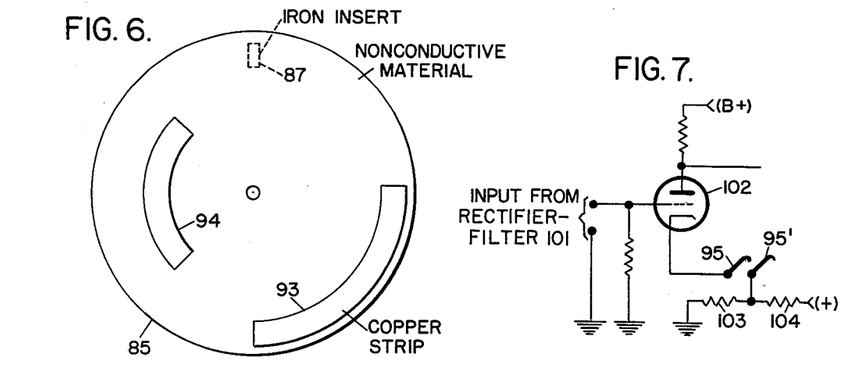
FIG. 7 is a typical circuit diagram showing the manner in which a gated amplifier of the type shown in FIG. 4 might be constructed.

Embodiment of FIGS. 5–7

FIGS. 5–7 illustrate still another embodiment of this invention wherein a rotating disc is employed. The cross-sectional view of FIG. 5 illustrates a typical disc which is preferably formed of a non-conductive and non-magnetic material such as one of the well-known types of plastics. Embedded in one face of the disc 85 near its periphery is a rectangular piece of iron 87 which is also illustrated in FIG. 6. Once for each revolution of disc 85 the iron segment 87 passes through an inductive coupling relationship with a U-shaped permanent magnet 88 having a winding 89 about its central portion. At the instant when the iron insert 87 is directly opposite permanent magnet 88, there is a substantial reduction in the reluctance of the magnetic circuit including the magnet 88 so that there is a great increase in magnetic flux with the result that a momentary voltage pulse is induced in winding 89. This voltage pulse is applied to the input of the triggered ultrasonic pulse oscillator 90, thereby causing it to generate a brief pulse of energy at a predetermined ultrasonic frequency. This ultrasonic pulse is amplified by voltage amplifier 91 and power amplifier 92, with the output of the latter amplifier being applied to the transmitting transducer TT so that a sound pulse is transmitted. For each revolution of disc 85, therefore, a sound pulse is transmitted.

Preferably, the iron segment 87 is not exposed on the surface of disc 85 but is covered by a layer of the plastic material of which disc 85 is formed, thereby preventing it from having any shunting effect upon fixed contacts 95 and 95′ whose function will be explained below. As an alternative, of course, the iron segment 87 may be positioned at a different distance radially from the center of the disc so that it cannot possibly come into contact with any of the fixed contacts. This latter alternative may be preferable since it permits a closer spacing between the segment 87 and the poles of magnet 88.

Affixed to the face of the disc at selected arcuate portions thereof near its periphery are commutator-like segments such as the segments 93 and 94 illustrated in FIG. 6. Each is adapted to shunt a pair of fixed contacts over a preselected portion of each revolution of the disc. The two segments are located at different radial distances so that each pair of fixed contacts on one side of a disc will make contact only with one of the two segments on that side of the disc. For example, only the segment of longer radius, segment 93, can shunt the fixed contacts 95 and 95′. Similarly, only segment 94 can shunt contacts 97 and 97′. Of course, the non-conductive properties of disc 85 prohibit any shunting of a pair of contacts except by the respective segment 93 or 94. Preferably, these segments are flush with the surface of disc 85 so that the contacts always encounter a smooth surface.

Upon rotation of disc 85 beyond that point in its rotation where the sound pulse has been generated by reason of iron insert 87 passing permanent magnet 88, the contacts 95 and 95' become shorted together by the conductive strip 93 which may be formed of copper. This shunting of the two contacts has the effect of gating the vehicle reflection amplifier 96. As the disc 86 continues to rotate, the copper segment 94 turns into position where it can shunt contacts 97 and 97' and when this occurs the wires 98 and 99 will be shunted together so that a gating input is applied to the pavement reflection amplifier 100.

Each received reflection pulse impinging upon receiving transducer RT provides a negative-going voltage pulse from rectifier-filter 101 which will be applied to both amplifiers 96 and 100. If the output of rectifier-filter 101 corresponds to a vehicle reflection signal, only the amplifier 96 will respond to such signal because segment 93 is so positioned that it will shunt contacts 95 and 95' only throughout the interval that a reflection signal from the vehicle can be expected. In a similar way, a pavement reflection signal will produce an output only from amplifier 100 since, at the time such pulse is received, segment 94 will be in position where it can shunt contacts 97 and 97' and thus gate amplifier 100.

The repeated outputs of amplifier 96 that occur when a vehicle is present cause the vehicle relay control circuit 26 to deenergize relay VR but this relay will normally be picked up since vehicle reflection pulses will normally not be received. Pavement reflections are normally received, however, so that the pavement relay control circuit 28 will act on relay PR to cause it to be normally dropped away.

FIG. 7 illustrates a typical manner in which an amplifier such as 96 may be organized to respond only when the contacts 95 and 95' are shunted. The input signal comprises positive-going pulses obtained from the preceding rectifier-filter 101 as already described and representing the received reflection pulse. These are applied between the grid of tube 102 and ground. The grid-cathode circuit of tube 102 is normally open at contacts 95 and 95' so that it cannot conduct, and the plate voltage is therefore at a high level. When contacts 95 and 95' are shunted, as by conductive segment 93, the cathode circuit is closed but the plate voltage of tube 102 remains at a low level because its control grid is substantially at ground while its cathode is provided with a suitable possible bias voltage by reason of the connection of its cathode through contacts 95, 95' to the function of resistors 103 and 104. If now, however, a negative-going pulse is applied to the grid, the tube will be cut off so that a positive-going voltage pulse appears at its plate and this is applied to the following relay control circuit. When these positive-going voltage pulses occur repeatedly, the relay control circuit controls relay VR to drop away.

In all of the different embodiments disclosed thus far, use has been made of both the vehicle and pavement sound pulse reflections. As described, this provides a high degree of discrimination, thereby clearly minimizing the possibility that extraneous objects passing through the detection zone will be registered. However, there are occasions when such high degree of discrimination is not of paramount importance and it may then be desirable to provide a more simplified system which may utilize only the vehicle reflection pulses or only the pavement reflection pulses. For example, it may be desirable to demarcate only the interval throughout which vehicle reflection pulses are reflected so that all other reflection pulses including those coming from the pavement will be ignored. Then, in the absence of a vehicle, when only pavement reflection pulses are received, there will, in effect, be no output of the receiving means since these pavement reflections will be entirely ignored. Upon the entry of a vehicle into the detection zone, vehicle reflections will occur and these will be recognized as such and cause a vehicle relay to be actuated and this alone will permit registration of that vehicle. Where the invention is constructed according to these particular principles, it will then, of course, be unnecessary to provide a pavement relay or any of the circuitry for controlling such relay.

On the other hand, it may be deemed desirable to provide a still different embodiment of the invention wherein only the pavement reflection pulses are utilized and the vehicle reflection pulses are ignored. In such embodiment, a time interval is demarcated throughout which pavement reflection pulses may be expected and when these are received, as when no vehicle is present, the receiving means will provide an output pulse for each transmitted sound pulse. This will then cause the pavement relay to be actuated and thereby indicate that no vehicle is present. It is then not necessary to demarcate an interval throughout which vehicle reflection pulses can be expected, nor is it then necessary to provide a vehicle relay or any of the circuit means for controlling such a relay. In other words, when no vehicle is present, the repeated reception of pavement reflection pulses actuates the pavement relay and thereby indicates the absence of any vehicle. However, when a vehicle enters the sound beam, the pavement reflection pulses are blocked. Their absence results in actuation of the pavement relay to an opposite condition so that the presence of the vehicle is registered.

Having described various embodiments of an invention providing for the detection of objects or vehicles by means of the effects produced by such vehicles as they pass through a beam of repetitive sound pulses, we desire it to be understood that various modifications, adaptations, and alterations may be made to the specific forms shown to meet the requirements of practice without in any manner departing from the spirit or scope of this invention. In particular, it should be understood that, although the appended claims refer to the system of this invention as being particularly organized for the detection of vehicles, the principles of this invention apply equally well to the detection of other objects as well.

What we claim is:

1. In a system for detecting vehicles as they pass through at least one detection zone defined by a beam of repetitive energy pulses directed across their path the combination comprising, transmitting means including a transducer for transmitting said energy pulses, receiving means including a transducer for receiving a reflection of each said pulse from the energy reflecting surfaces of each vehicle as it passes through said zone and being received only during a predetermined first interval following the transmission of said pulse, said receiving means also receiving during a predetermined second interval when no vehicle is in said detection zone a reflection of each said pulse from at least one more distant energy reflecting surface upon which said pulses can impinge only when no vehicle is intercepting said beam, reflection discriminating means connected to the output of said receiving means and including a rotating means revolving synchronously relative to the rate of energy pulse transmission and controlling said reflection discriminating means to produce a distinctive output signal only in response to reflection pulses received during at least one predetermined portion of its rotation which is coextensive with one of said predetermined intervals, and output means being controlled by the output of said reflection discriminating means to a distinctive condition for indicating the passage to a vehicle through said detection zone.

2. The vehicle system of claim 1 wherein said rotating means controls said transmitting means on at least one predetermined portion of each revolution to transmit a respective pulse.

3. The system as defined in claim 1 and further including a steadily illuminated light source and at least one light receiving means of the type which generates an electrical signal when light impinges thereon, said light receiving means being positioned to receive light from said light source but being normally blocked from receiving said light by said rotating means, said rotating means comprising a light blocking disc being interposed between said light source and said light receiving means and having at least one slot therethrough positioned so as to move into place between said light source and said light receiving means on said predetermined portion of said revolution of said disc, said transmitting means being controlled to transmit a respective pulse by each output signal of said light receiving means.

4. The combination of claim 1 and further including a magnetic circuit comprising a winding adapted to have a voltage generated therein by a change in magnetic flux of said magnetic circuit, said rotating means including magnetizable means adapted to move into an inductive coupling relation with said magnetic circuit at least once for each revolution of said disc to thereby vary the magnetic flux of said magnetic circuit and generate a voltage in said winding, said transmitting means being normally inoperative but being controlled to generate a pulse for transmission across the path of said vehicles by the voltage generated in said winding.

5. The invention as defined in claim 1 wherein said reflection discriminating means includes a light source being connected to the output of said receiving means so as to be illuminated in response to each reflection of each transmitted pulse received by said receiving transducer and also includes a light receiving means positioned to receive the light emanating from said light source and being of the type which provides an electrical output signal in response to such received light, said rotating means including a light blocking disc being interposed between said light source and said light receiving means and having a slot therethrough which selectively comes into position between said light source and said light receiving means throughout said predetermined portion of its rotation to thereby selectively permit light from said light source to impinge upon said light receiving means, said output means being controlled to said distinctive condition by the occurrence of said electrical output signal generated by said light receiving means on successive revolutions of said disc.

6. The vehicle detection system of claim 1 wherein said rotating means controls said reflection discriminating means to produce a distinctive first output signal in response to reflection pulses received during a predetermined first portion of its rotation being coextensive with said first predetermined interval and to produce alternatively a distinctive second output signal in response to reflection pulses received during a predetermined second portion of its rotation being coextensive with said second predetermined interval, said output means being controlled to said distinctive condition by the occurrence of said first output signals concurrently with the absence of said second output signals.

7. The vehicle detection system of claim 1 wherein said reflection discriminating means includes a gated amplifier connected to the output of said receiving means and providing an output signal in response to an input signal applied thereto only when it concurrently receives a gating signal, said rotating means including a revolving disc formed of an electrically non-conductive material and having at least one arc-shaped conductive segment on its surface, contact means for said gated amplifier including at least one fixed contact member positioned to come into contact with said conductive segment on said disc selectively during rotation thereof, said conductive segment being positioned on said disc so as to contact said fixed contact member only during one predetermined portion of its rotation, means associated with said contact means for supplying said gating voltage to said gated amplifier only when said fixed contact member is in contact with said conductive segment on said disc, said output means being controlled to said distinctive condition by the repeated occurrences of said output signal of said gated amplifier.

8. The vehicle detection system of claim 1 wherein said reflection discriminating means includes a light source positioned on and adapted to be rotated by said rotating means, said light source being connected electrically to the output of said receiving means and being illuminated by each output signal of said receiving means corresponding to a received reflection of said transmitted sound pulses, at least one light receiving means being fixed in position relative to said light source and adapted to receive light emanating from said light source only during said one predetermined portion of rotation of said rotating means, said light receiving means being energized by light impinging thereon from said light source and providing a distinctive output signal in response thereto, said output means being controlled to its said distinctive condition by the output signals provided by said light receiving means.

9. The system as set forth in claim 8 wherein said light receiving means includes a substantially parabolically shaped reflecting surface having a photocell positioned substantially at its focus, said reflecting surface being dimensioned to receive light from said light source and reflected toward said photocell only during said one predetermined portion of rotation of said rotating means.

10. In a system for detecting vehicles as they pass through a detection zone defined by at least one beam of sound pulses directed across their path the combination comprising, transmitting means including a transducer for transmitting said beam of sound pulses, receiving means including a transducer and being so positioned and directed as to receive reflections of said sound pulses from the sound reflecting surfaces of said vehicles as they pass through said sound beam, reflection discriminating means connected to said receiving means and including rotating means revolving synchronously relative to the rate of said pulse transmission for controlling said reflection discriminating means to produce an output signal only in response to a reflection pulse received on a predetermined portion of its rotation which encompasses the expected reception by said receiving means of the reflection of the last transmitted sound pulse from said vehicle reflecting surfaces, and output circuit means connected to said reflection discriminating means and being controlled to a distinctive condition indicative of the presence of a vehicle when said reflection discriminating means produces an output signal after each of a predetermined plurality of successive transmitted sound pulses.

11. In a system for detecting vehicles as they pass through a detection zone defined by at least one beam of sound pulses directed across their path and impinging when no vehicle is present upon a sound reflecting surface more distant than said vehicles so that the passage of each vehicle prevents said beam from impinging upon said more distant surface the combination comprising, transmitting means including a transducer for transmitting said beam of sound pulses, receiving means including a transducer being so positioned and directed as to receive reflections of said sound pulses from said more distant surface when no vehicle is present within said beam, reflection discriminating means connected to the output of said receiving means and including a rotating means revolving synchronously relative to the rate of transmission of said sound pulses and controlling said reflection discriminating means to produce an output signal only in response to a reflection pulse received during a predetermined portion of its rotation which encompasses the expected reception by said receiving means of reflections of the last transmitted sound pulse from said more distant reflecting surface, and output circuit means being connected to said reflection discriminating means and being controlled to a distinctive condition indicative of the presence of a vehicle within said sound beam when said reflection discriminating means fails to produce said distinctive output signal in response to a predetermined plurality of successive transmitted sound pulses.

12. In a system for detecting the presence of vehicles the combination comprising, transmitting means including a transducer for transmitting a beam of repetitive sound pulses toward said vehicles but with said beam impinging when no vehicle is present upon a more remote reflecting surface, receiving means including a transducer being positioned and directed to receive reflections of said sound pulses both from a vehicle when one is within said beam and alternatively from said more remote surface when no vehicle is present, whereby the reflection of each transmitted sound pulse received by said receiving means has a longer roundtrip propagation time when reflected from said more remote surface than when reflected from said vehicle, discriminatory means having the output of said receiving means applied thereto, said discriminatory means including a constantly rotating means controlling said transmitting means to transmit a respective one of said sound pulses each time it passes through at least one initial position, said rotating means on subsequent first and second intervals throughout which it passes through respective first and second portions of its rotation prior to its again reaching said initial position controlling said discriminatory means to produce separate first and second output signals in response to reflection signals applied thereto and occurring respectively during said first and second intervals, said first interval demarcated by said rotating means in its said first portion of its rotation being coextensive with the expected reception time of reflections of the last transmitted sound pulse from a vehicle intercepting said beam, said second interval demarcated by said rotating means in its said second portion of its rotation being coextensive with a further time interval throughout which a reflection of the last transmitted pulse can be expected from said more remote surface, and output means being controlled to a distinctive condition indicative of the presence of a vehicle within said beam by the first and second output signals of said discriminatory means.

13. The vehicle detection system of claim 12 wherein said discriminatory means comprises a light source being illuminated by the output of said receiving means and also comprises two light receiving means of the type generating an electrical signal when light impinges thereon, said light receiving means being both on one side of said rotating means opposite to that of said light source but being so positioned that were it not for the blocking effect of said rotating means both said light receiving means would receive the illumination of said light source, said rotating means on said first portion of its rotation unblocking a light path from said light source to said first light receiving means and on said portion of its rotation unblocking a light path from said light source to said second light receiving means, whereby said first and second light receiving means selectively produce said first and second output signals.

14. The vehicle detection system defined in claim 12 wherein said discriminatory means comprises a plurality of spaced photocells and a constantly illuminated light source, said rotating means including a light reflecting surface positioned to receive a narrow beam of light from said light source, said photocells being positioned so as to be scanned in order by the reflection of said light beam from said reflecting surface, a first one of said photocells when energized by said reflected light beam controlling said transmitting means to transmit a respective sound pulse, first and second gated amplifier means both having the output of said receiving means applied thereto but being normally both in non-amplifying conditions, first gating circuit means being controlled by the output of a second of said photocells to a distinctive condition wherein it controls said first amplifier means to an amplifying condition but being subsequently restored to its normal condition by the output of the third of said photocells to be scanned by said beam, second gating circuit means being controlled by the output of a fourth of said photocells to be scanned by said beam to a distinctive condition wherein it controls said second amplifier means to an amplifying condition and being subsequently restored to its normal condition by the output of a fifth of said photocells to be scanned by said beam, said photocells after the first being so spaced relative to each other and relative to said first photocell that said first and second gating means are each in said distinctive condition throughout said first and second portions of rotation of said reflecting surface respectively.

15. The vehicle detection system of claim 12 wherein said discriminatory means includes a light source positioned on and adapted to be rotated by said rotating means, said light source being connected electrically to the output of said receiving means and being illuminated by each output signal of said receiving means corresponding to a received reflection of said transmitted sound pulses, first light receiving means being fixed in such a position that it can receive light emanating from said light source only during said first predetermined portion of rotation of said rotating means, second light receiving means being fixed in position so as to receive light emanating from said light source only during said second predetermined portion of rotation of said rotating means, each said light receiving means being energized by light impinging thereon from said light source and providing said distinctive first and second output signals respectively in response thereto.

16. The invention as defined in claim 12 wherein said discriminatory means includes first and second gated amplifiers both having the output of said receiving means applied thereto and each providing an output signal in response to its input signal only when it concurrently is receiving a respective gating signal, said rotating means including a revolving disc formed of an electrically non-conductive material and having first and second arc-shaped conductive segments on its surface, first contact means for said first gated amplifier being fixed in position so as to come in contact with said first conductive segment, second contact means for said second gated amplifier being fixed in position so as to come in contact with said second conductive segment, said first and second conductive segments being so positioned on the surface of said disc as to come in contact with said first and second contact means respectively during said first and second portions of rotation of said rotating means respectively, each said contact means when in contact with its respective conductive segment controlling the associated gated amplifier to an amplifying condition.

References Cited in the file of this patent

UNITED STATES PATENTS

| | | |
|---|---|---|
| 2,594,276 | Barker | Apr. 29, 1952 |
| 2,655,645 | Bagno | Oct. 13, 1953 |